United States Patent [19]

Clark

[11] Patent Number: 5,348,041
[45] Date of Patent: Sep. 20, 1994

[54] SEPARATOR VALVE

[76] Inventor: Stephen E. Clark, 1344 Monterey Ave., Norfolk, Va. 23508

[21] Appl. No.: 65,592

[22] Filed: May 21, 1993

[51] Int. Cl.$^5$ .................................... F16K 31/22
[52] U.S. Cl. .................... 137/172; 137/192; 137/433; 137/613
[58] Field of Search ............... 137/172, 192, 399, 433, 137/613

[56] References Cited

U.S. PATENT DOCUMENTS

| | | | |
|---|---|---|---|
| 4,132,238 | 1/1979 | Clark | 137/172 |
| 4,425,933 | 1/1984 | Fetsch | 137/172 |
| 4,580,592 | 4/1986 | Clark et al. | 137/172 |
| 4,742,842 | 5/1988 | Garneau et al. | 137/172 |
| 4,745,942 | 5/1988 | Delwiche | 137/192 X |
| 5,161,564 | 11/1992 | Clark | 137/172 |

Primary Examiner—Martin P. Schwadron
Assistant Examiner—Kevin L. Lee

[57] ABSTRACT

Automatically resetting mechanical valve is used to control unwanted discharge of liquids less dense than water, principally oil, which may be present in waste water flows. The valve is closed by the sinking of a primary flow which closes a primary orifice, and the floating of a secondary float which closes a smaller secondary orifice. The primary float is less dense than water but more dense than oil. The secondary float is less dense than both oil and water. When the primary float becomes sufficiently immersed in oil, the primary float sinks and effectively closes the primary orifice in an outlet conduit. In the event of evaporation or removal of liquid from the valve, the (smaller) secondary orifice automatically opens, thereby allowing hydrostatic pressure inside and outside of the outlet conduit to equalize. Upon reintroduction of water to the device, the primary float unseats and the valve automatically re-opens. Additionally ingress of liquid causes the secondary float to float, thus closing the secondary orifice.

8 Claims, 6 Drawing Sheets

SEPARATOR VALVE

FIELD OF INVENTION

The present invention relates to a means for the prevention of the accidental discharge of oils and other liquid contaminants into sewage systems, streams and other bodies of water, and, to the control of processes requiring regulation of the flow of liquids with differing specific gravities. In particular, the present invention relates to direct-acting, outlet-closing, specific-gravity sensitive, float controlled separator valves which are automatic cycling.

DISCUSSION OF PRIOR ART

Although the present invention has application in the prevention of discharges and accidental mixing of many liquids, for simplicity, its application in the prevention of oil discharges will be described.

As is generally known, most oils are immiscible with water and, due to the lower density of the former, tends to rise to the surface of the water.

It has long been the practice to install grease traps, or oil-water separators, in waste water lines which may be contaminated with oil.

In general these devices provide a containment in which the oil and water mixtures are permitted a period of quiescence during which the lighter density oil rises to the surface of the water where it is contained by baffles or walls. The heavier density water is drained from the lower portion of the containment.

When the grease trap becomes full with oil it must be pumped out or the oil removed by some other means. If the oil is not removed, or, if due to an accident, the containment is flooded with oil, then the oil will start flowing out through the water drain.

To reduce the probability of water pollution due to oil spills and discharges of oil in industrial waste water effluents, grease traps, oil-water separators, dikes, holding ponds and other containment devices are installed in great numbers, frequently at the direction of government agencies concerned with environmental protection. In all of these containments it is necessary to provide for drainage of rain or other waste water. If the containment becomes filled with oil while the water drain valve is open then the oil will be discharged, causing pollution.

Prior devices are known which automatically close water drains in such containments to prevent the accidental discharge of oil or other liquid containments by utilizing the lower density of the oil to effect the sinking of a float which in turn seals off the water drain. U.S. Pat. No. 4,132,238 is an example of such a device.

Such prior devices typically rely on a specific gravity sensitive float to sink in the less dense liquid, (typically oil), and thereby close an outlet orifice.

A problem which is inherent in such prior devices is that whenever the float closes the outlet orifice, (whether due to sinking in a lower density liquid; or by accidental closing due to being drain towards the outlet by the eductive pressure of the discharging effluent; or due to the seating of the float in the absence of any liquid in the device), the float cannot automatically be re-opened simply by the introduction (or re-introduction) of water into the device. Instead, such prior devices must usually be manually re-opened once closed.

This is due to the fact that the float sinks only when there is relatively low (and in some cases, no) hydrostatic pressure at the bottom of the float, and, therefore, relatively low (and in some cases, no) hydrostatic pressure inside of the outlet conduit at the seat of the float. When water is re-introduced into the device so as to completely immerse the float in water, the hydrostatic pressure acting on the float is inherently greater (and in most cases significantly greater) than the hydrostatic pressure inside of the outlet conduit and acting on the bottom of the float. Since the net buoyant force available to lift (i.e. unseat) the float is afforded by the relatively minimal difference in specific gravity of the oil and the water, it is virtually impossible for such a net buoyant force to overcome the seating force of the float and, thereby re-open prior direct-acting, large-orifice devices.

Prior needle valve devices are known wherein a direct-acting float can be re-floated to re-open a relatively small orifice. A problem of such prior devices is that flow through the needle valve's orifice is necessarily very slow and is not appropriate for use, for example, in the draining of bulk storage tanks. Another problem of devices whose primary discharge orifice is a needle valve orifice is that such devices are not adaptable for thick or debris-contaminated liquids (as such liquids tend to clog the small orifices).

In the case of oil having a specific gravity of, for example, 0.87, and a float having a specific gravity between that of the oil and that of water of, for example, 0.94, it can be shown that the maximum allowable head that can be added before which a direct-acting float cannot be re-floated can be calculated by the equation:

$$Y = 0.06\ LX,$$

where Y is the difference in total head pressure above the orifice (in inches of water) and the water head below the valve seat (in inches of water); and L is the vertical length of an elongated float; and X is the ratio of cross-sectional area of the float to the area of the orifice upon which the elongated float is seated.

By use of this (above) equation it can be demonstrated that for a practical size direct-acting valve whose length (L) is 12 inches, and whose ratio of float area to valve seat area (X) is no greater than 1.25/1, it would be impossible to re-float the float if the difference in elevations between the inlet and the outlet is more than more than 0.9 inches, (or, approximately 0.03 pounds per square inch of head). Similarly, it can be demonstrated that to re-float a direct-acting valve whose (gravity flow) inlet is 6 inches above its outlet (Y), and whose ratio of float area to valve area (X) is no greater than 1.25/1, the float would have to be at least 80 inches high. This analysis shows that for direct-acting floats of a practical size, the maximum allowable head against which such devices would be capable of automatically re-opening is very small, (in the 1-inch to 2-inch range). Thus, it will be appreciated by those skilled in the art that, for all practical purposes, a float in a common direct-acting 12-inch diameter valve therefore will not be re-floated due, for example, to storm water entering a catch basin containing such a valve.

A device which automatically resets for continuous separation of two immiscible liquids is described in U.S. Pat. No. 5,161,564. In this prior device, a secondary float having a density less than water but greater than oil is coupled to a primary float (which also has a density less than water but greater than oil) via a lever having a high mechanical advantage. After the valve closes (i.e. after the primary float has seated upon an outlet orifice), whenever a sufficient quantity of water is re-introduced into the valve the secondary float pries the primary float away from the outlet orifice, thus automatically re-opening the valve. Valves of this prior type can be constructed to re-open against very large pressure heads as well as small pressure heads. A problem with this prior device is that the density of the secondary float must be held within relatively close tolerances (i.e. must be greater than the density of oil, but less than the density of water) in order to operate properly.

Also, a separator valve made in accordance with U.S. Pat. No. 5,161,564 will automatically re-open whenever a sufficient quantity of water is re-introduced into the valve, regardless of whether the valve initially became closed due to the primary float's sinking in a lower density liquid; or due to the seating of the float in the absence of any liquid in the device. In some applications it may be desirable that the outlet orifice be permitted to automatically re-open only in instances where the valve became closed initially because of the absence of any liquid in the device (such a may occur in infrequently used installations or in dry environments); but not automatically re-open if the valve became closed due to an oil spill.

"Bleed" holes have been proposed (for example in U.S. Pat. No. 5,161,564) in the outlet conduit of prior separator valves in order to reduce the difference in pressure acting against the bottom of the closure float from inside of the conduit and the pressure acting on the top of the closure float. Such "bleed" holes are useful in equalizing the hydraulic pressure inside and outside of the outlet conduit when the valves are starved (or nearly starved) of liquid. However, by their very nature, bleed holes necessarily compromise the liquid-containment integrity of such valves because liquid inside of the containment can readily bypass the closure float and exit by way of the bleed hole.

OBJECTS

Accordingly, the primary object of the present invention is to provide a specific gravity sensitive valve whereby the denser of two liquids is permitted free gravity discharge therefrom and the less dense of said two liquids is contained.

It is a further object of the present invention to provide a valve of the character described wherein flow of liquid out of the valve is controlled by a specific gravity-sensitive float which may close against an outlet orifice.

A further object of the invention is to provide a valve of the character described wherein a specific gravity-sensitive float will close against an outlet orifice in the absence of said denser liquid, and which will automatically re-open upon the re-introduction of a sufficient quantity of said denser liquid to the device.

It is another object to provide an embodiment of the present invention wherein a specific gravity-sensitive float which closes against an outlet orifice will automatically re-open upon the re-introduction of a sufficient quantity of said denser liquid to the device only if closure of the valve resulted from absence of liquid in the device, and which valve will not automatically re-open upon the re-introduction of said denser liquid to the device if closure of the valve resulted from presence of a sufficient quantity of said lighter liquid.

It is a further object of the present invention to provide a device of the character described having, in addition to the outlet orifice, a float-controlled second closeable orifice which opens to equalized hydraulic pressure inside and outside of the outlet conduit whenever there is less than a pre-selected minimum quantity of liquid in valve.

It is a further object of the present invention to provide a device of the character described having, in addition to the outlet orifice, a float-controlled second closeable orifice which closes whenever there is more than a pre-selected minimum quantity of liquid in the valve.

It is a further object of the present invention to provide a device of the character described in which discharge of said denser liquid therefrom may be at a high rate and not restricted to flow through a needle valve or similar small orifice.

These and other objects and advantages of the present invention will become better understood to those skilled in the art by reference to the drawings and ensuing description thereof.

DRAWINGS

DESCRIPTION

Figure 1:
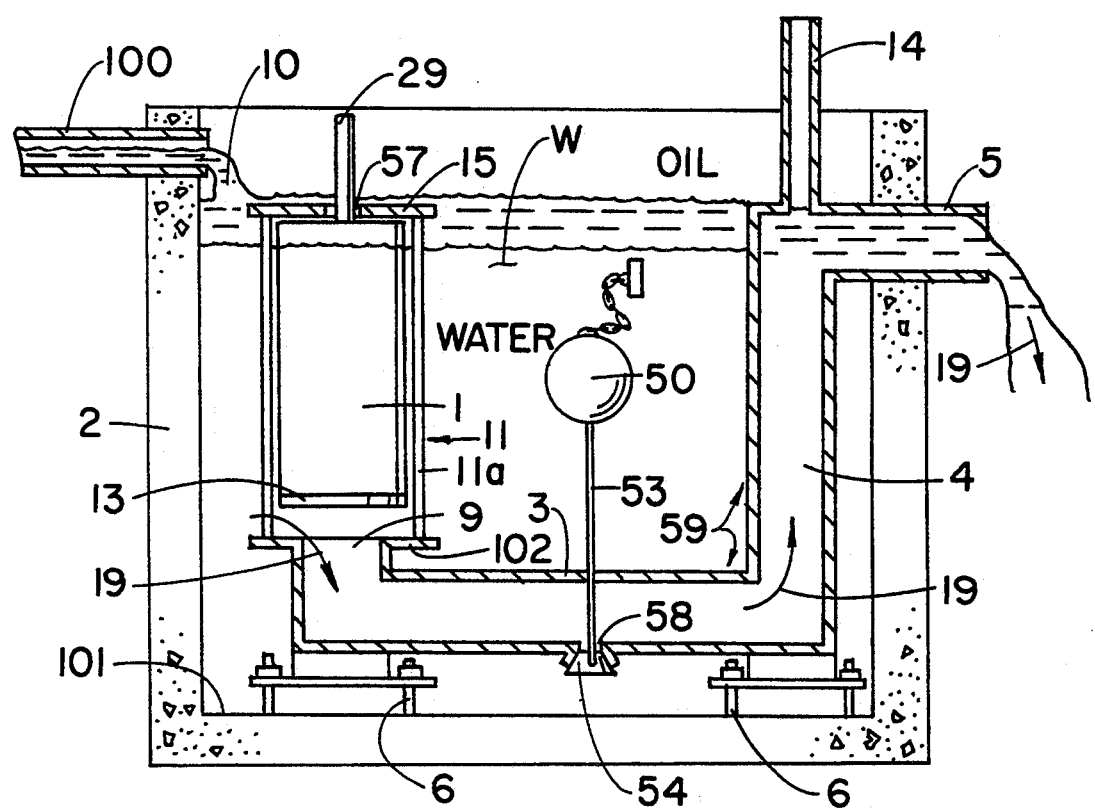
FIG. 1 is a side elevation in cross section of the present invention.

An outlet conduit, generally indicated as 59 in the drawings, comprising a horizontal conduit 3 and a riser 4, is connected to the discharge outlet pipe 5. Legs 6 may be provided to lift horizontal conduit 3 to a position above the floor 101 of containment 2 avoiding fouling by contact with settled grit and sludge.

Minimum operational liquid level in the containment 2 is determined by the level of the discharge outlet pipe 5, which is at a level such that the primary float 1 is buoyed high enough to allow free passage of water through primary orifice 9.

Waste water 10 enters the containment 2 through inlet 100 from an external source (not shown). Sand, sludge and other components heavier than water, settle to the floor 101 of containment 2. Oil, being lighter than water, rises to the top and is prevented from passing through primary orifice 9.

Oil-free water flows around and beneath the primary float 1, through primary orifice 9, horizontal conduit 3, up riser 4, and is discharged through the discharge outlet pipe 5, as indicated by arrows 19.

Primary float 1, preferably comprised of a watertight elongated body, having a specific gravity of less than 1.00, and greater than the specific gravity of the oil or other lighter-than-water fluid, is contained in housing 11, which in the preferred embodiment of the invention comprises four or more vertical rods 11a attached to a top plate 15 and a bottom plate 102. A valve disk 13 may be provided on the bottom of the primary float 1 which is adapted to seat with the primary orifice 9 and seal the primary orifice 9 against liquid flow through the outlet conduit 59. A vertical centering rod 29 extends from the top of the primary float 1 and upward through a hole 57 in the housing top plate 15.

Figure 10:
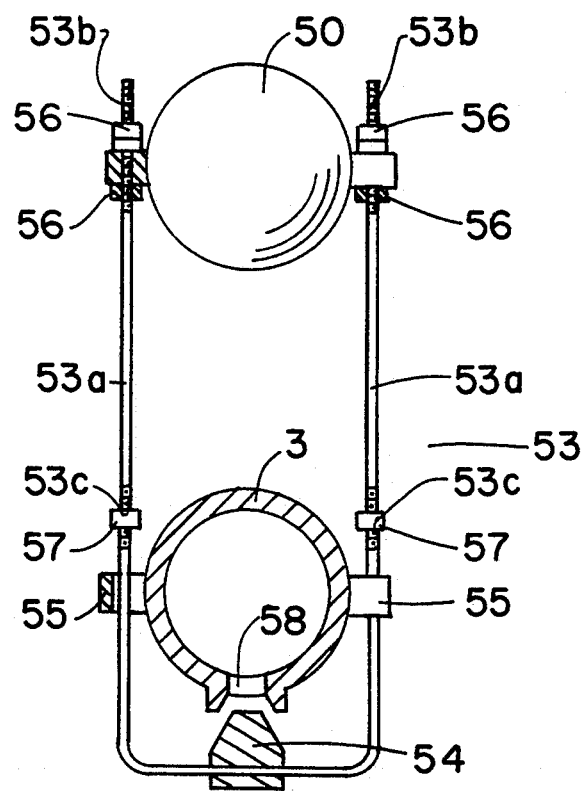
FIG. 10 is a cross-sectional view of the outlet conduit showing details of construction of the secondary float.

A secondary orifice 58 located in the horizontal conduit 3 is preferably aimed downward. A link arm device, generally designated as 53, is attached to an upwardly directed secondary seal 54 which is aligned with the secondary orifice 58, as is best illustrated in FIG. 10. The link arm passes through link guides 55 attached to the horizontal conduit 3, such that the link arm device 53 may freely move upwardly and downwardly through the guides 55. A secondary float 50, having a specific gravity less than that of oil and water, is attached to the link arm 53 above the horizontal conduit 3. In the preferred embodiment of the invention the link arm device 53 comprises an elongated rod with two vertically directed sections 53a, the ends 53b of which are threaded and secured to the secondary float 50 with nuts 56. An intermediate section 53c of the link arm device 53 may be threaded and provided with adjustment nuts 57 which regulate the maximum amount of downward travel of the link arm device 53 and the secondary seal 54.

In the preferred embodiment of the invention the flow of fluids into and out of the containment 2 is accomplished by gravity flow of the respective fluids. The water discharge outlet 5 is at an elevation below that of the waste water inlet 100. The water discharge outlet 5 is at an elevation above that of orifice 9 and is sufficiently high such that when the level of water inside of the containment 2 is as high as the elevation of the water discharge outlet the primary float 1 may float. The outlet conduit 59 is vented by vent pipe 14.

OPERATION

Referring to FIG. 1:

When housing 11 contains water W and little or no oil, the primary float 1 floats in the water W so that valve disc 13 is clear of orifice 9, permitting water to flow through orifice 9, conduit 3, and up riser 4, discharging through discharge outlet pipe 5. Discharge outlet pipe 5 may be vented, (pipe 14), to prevent siphoning. Vertical (upward) movement of the primary float 1 is limited by the top plate 15. As waste water 10 continues to enter the containment 2 through waste water inlet 100, the water continues to be discharged through the water discharge outlet 5.

When oil is contained in the waste water 10, oil entering the containment 2 will rise to the surface while the water, being more dense than the oil, continues to flow through housing 11, passes through the open primary orifice 9, and is discharged through the water discharge outlet 5, as indicated by arrows 19.

The secondary float 50 is immersed in the water and, being of lower density than water, is buoyed by the water, thereby pulling the secondary seal 54 upward against, and closing, the secondary orifice 58.

Figure 2:
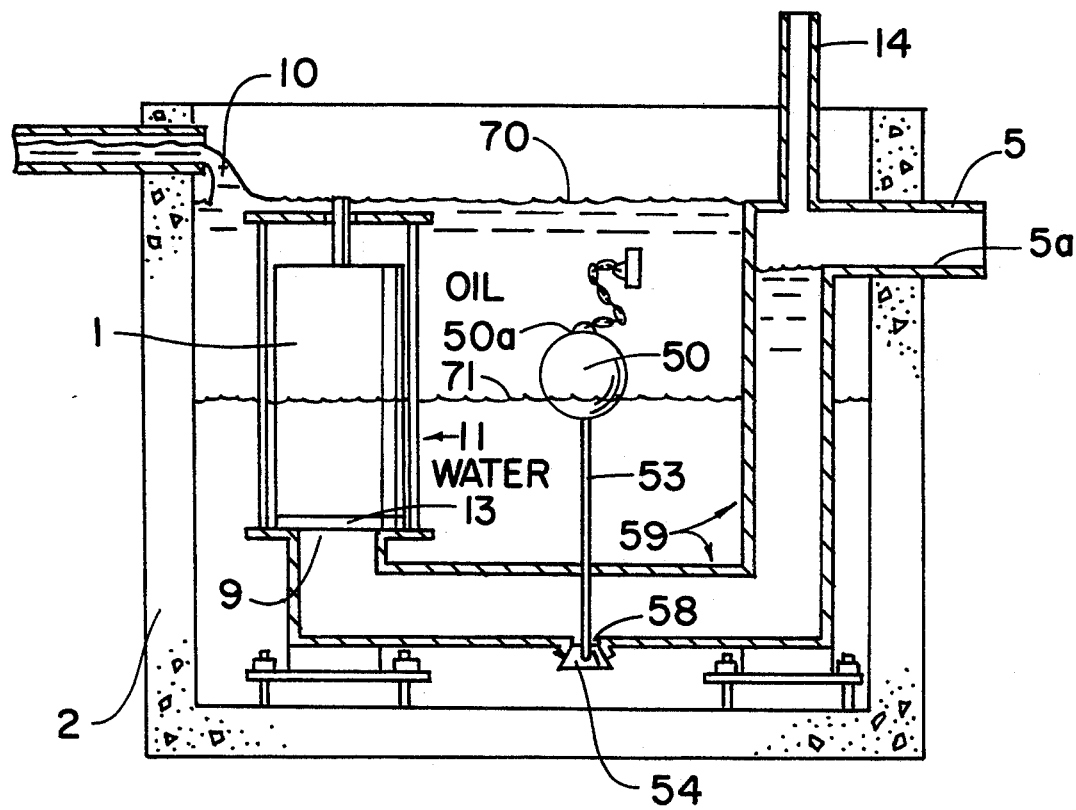
FIGS. 2–8 are cross sectional views of the present invention showing successive stages of operation.

Referring to FIG. 2:

As the amount of accumulated oil at the surface 70 within containment 2 increases, the depth of the oil-water interface 71 is lowered. Oil entering housing 11 lowers the specific gravity of the fluid therein, causing the primary float 1 to lose buoyancy and the sink.

The primary float 1 is restricted in its lateral movements by housing 11 which maintains primary float 1 in a position directly above primary orifice 9. When the specific gravity of the fluid within housing 11 is less than the specific gravity of primary float 1, primary float 1 will sink and come to rest upon orifice 9 as shown in FIG. 2, causing flow through the outlet conduit 59 and discharge from the containment 2 to cease.

The secondary float 50, being still immersed in liquid, continues to be buoyed by the liquid, causing the secondary seal 54 to maintain the secondary orifice 58 closed, thus preventing the passage of liquid from the outside to the inside of the outlet conduit 59 by way of the secondary orifice 58. In the preferred embodiment of the invention the top of the secondary float 50a is below the maximum elevation of the bottom of the inside of the discharge outlet 5a when the secondary seal 54 is seated against the secondary orifice 58; and in any case the secondary float 50 must be positioned such that the secondary float 50 floats in the liquid in which it is immersed (causing the secondary seal 54 to close the secondary orifice 58) at an elevation below that which gravity discharge of liquid from inside of the outlet conduit 59 is possible.

If waste water 10 continues to enter the containment 2, the liquid inside of the containment will accumulate above the depth necessary to sink float 1, and pressure on the valve disk 13 will increase proportional to the depth of the liquid 70 in the containment 2, producing an increasingly tight seal between the valve disk 13 and the primary orifice 9.

Figure 9:
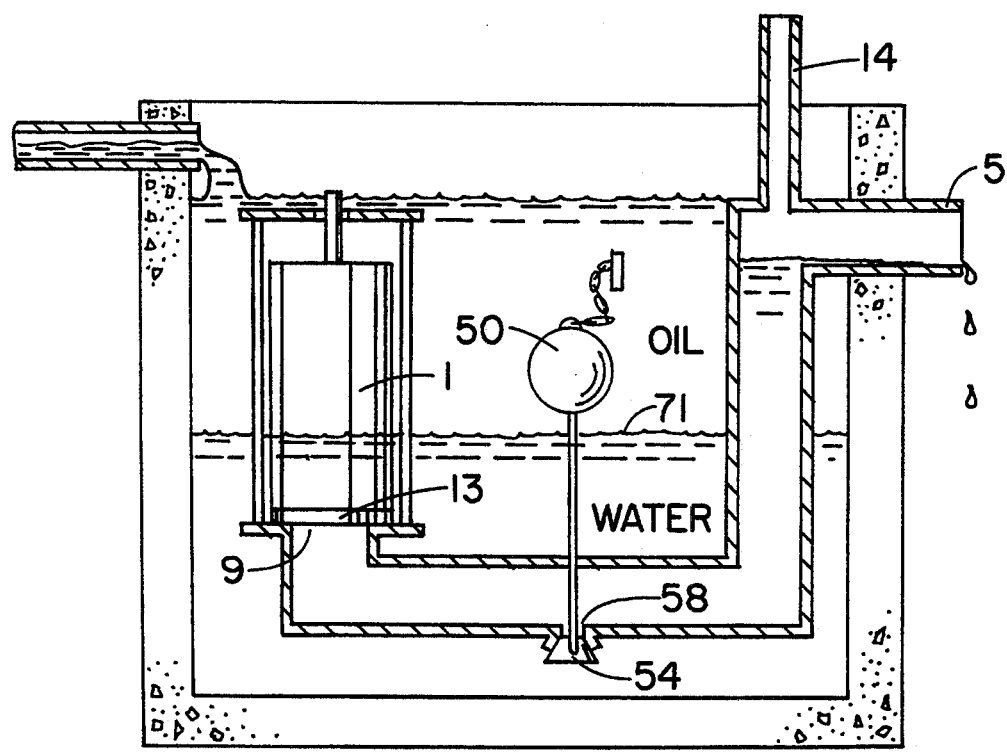
FIG. 9 is a side elevation in cross section showing a condition of partial failure of the primary float.

In the event of a failure condition of the primary float 1, such as indicated in FIG. 9, wherein a small amount of liquid leaks past the valve disk 13 through the primary orifice 9, the elevation of the oil/water interface 71 may slowly drop. In the preferred embodiment of the invention the density of the secondary float 50 is less than the density of oil, and, therefore, the secondary float 50 continues to float even when it is immersed in the oil (as shown in FIG. 9). Because the density of the secondary float 50 is less than the density of oil, the secondary seal 54 remains closed against the secondary orifice 58 even during failure of the primary float 1, thus preventing unwanted accidental discharge of oil through the secondary orifice 58. In the preferred embodiment of the invention the density of the secondary float 50 is substantially less than even the lighter fluid (i.e. preferably a specific gravity of 0.50 or less), and, accordingly, operation of the secondary float is substantially independent of the density of the liquid(s) inside the containment 2.

In the preferred embodiment of the invention the area of the secondary orifice 58 is substantially smaller than (i.e. ¼ to 1/100) the area of the primary orifice 9. The area of the secondary orifice 58 is preferably relatively small because the secondary orifice is primarily provided for the purpose of equalizing hydrostatic pressure inside and outside of the outlet conduit 59 rather than as a means of egress of fluid from the containment 2. Accordingly, the size of the secondary orifice may be relatively small because the operation of the device is substantially independent of the rate of flow of liquid through the secondary orifice 58.

Figure 3:
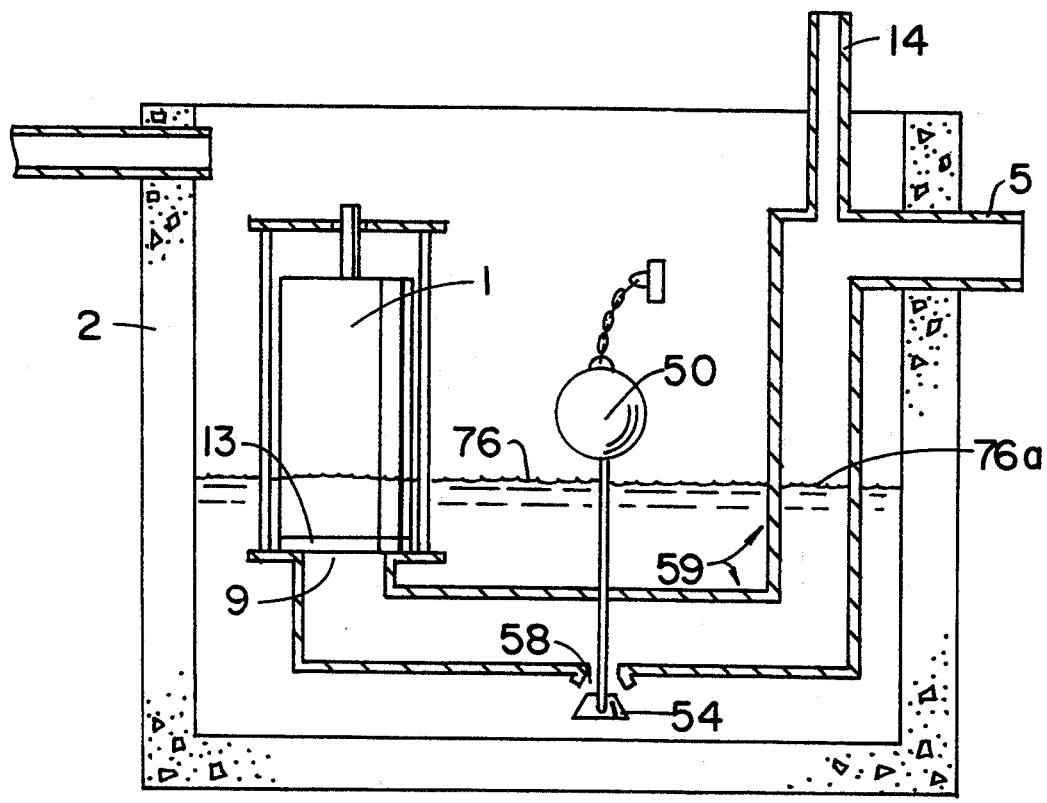

Referring to FIG. 3:

If the surface 76 of the liquid inside the containment 2 drops to an elevation below that which is necessary to float the primary float 1, the primary float 1 and valve disk 13 will come to rest upon the primary orifice 9. This condition may occur, for example, if the liquid inside of the containment 2 were to be pumped out, or drained, or if the liquid inside of the containment 2 were to evaporate.

When the surface 76 of the liquid inside of the containment 2 drops to an elevation below the secondary float 50, the liquid will cease to buoy the secondary float 50. Because the secondary float 50 is unbuoyed, it no longer holds the secondary seal 54 against the secondary orifice 58. Consequently, the secondary seal 54 and the secondary float 50 drop down so as to open the secondary orifice 58. When the secondary orifice 58 is open, the surface 76 of the liquid inside of the containment 2 and the surface 76a of the liquid inside of the outlet conduit 59 will settle out at the same elevation.

Figure 4:
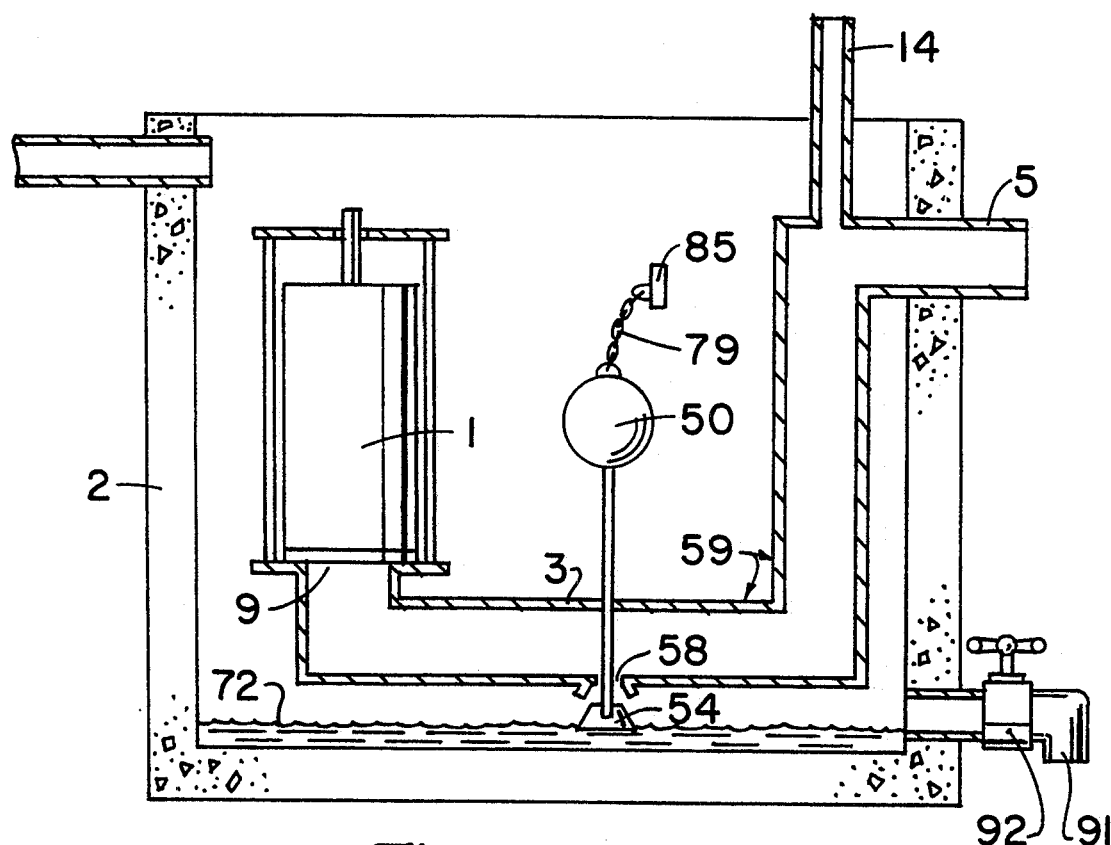

Referring to FIG. 4:

If water continues to be removed (i.e. by drainage, pumping, evaporation, etc.) from the containment 2 so that the surface 72 of the liquid is below the horizontal conduit 3, the entire outlet conduit 59 may become void of all liquid.

In the preferred embodiment of the invention the amount of downward travel of the secondary seal 54 and the secondary float 50 is limited. The downward travel of the secondary float 50 may be limited either by a retention chain 79 secured at one end to a bracket 85 attached to a wall of the containment 2 and at the other end to the secondary float 50 (as shown in FIG. 4), or by adjustment nuts 57 which are secured to intermediate sections 53c of the link arm device 53 (as shown in FIG. 10).

Figure 5:
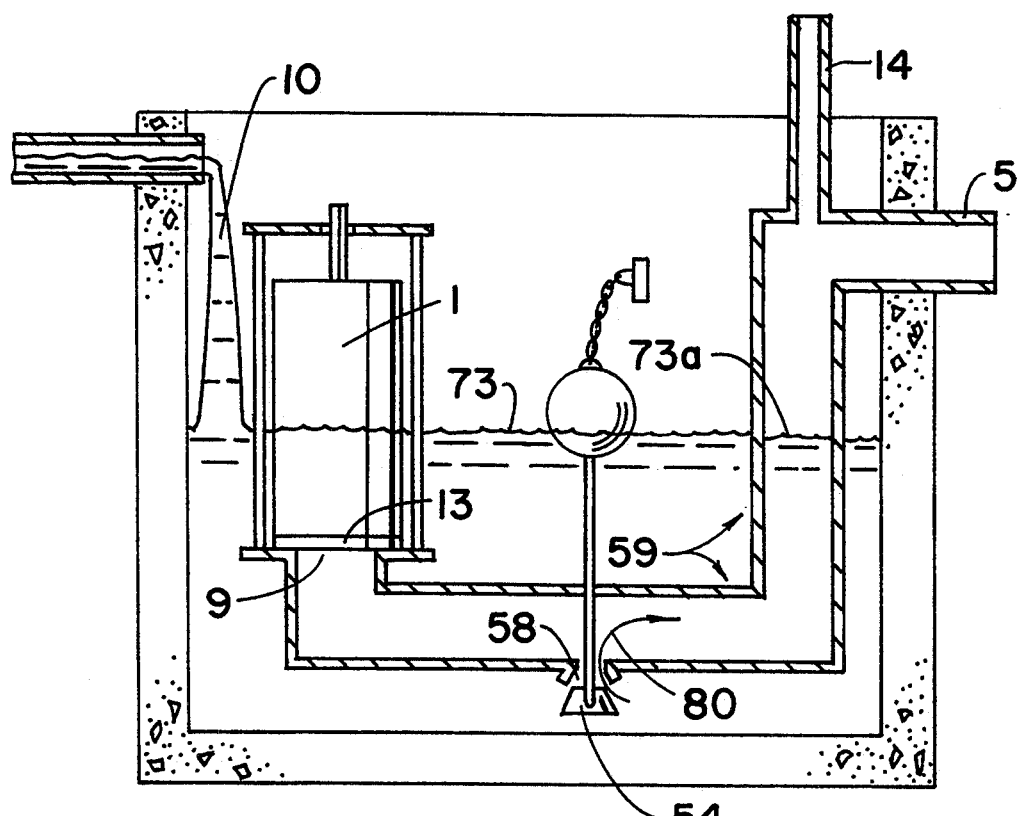

Referring to FIG. 5:

If waste water 10 is re-introduced into the containment 2, after the primary float 1 and the secondary float 50 have sunken, the elevation of the surface 73 of the liquid inside of the containment 2 and the elevation of the surface 73a inside of the outlet conduit 59 will rise at substantially the same rate. Until such time as the elevation of the surface 73 of the liquid inside of the containment reaches the elevation of the secondary float 50, some of the waste water 10 which enters the containment 2 will flow into the outlet conduit 59 via the secondary orifice 58 as indicated by arrow 80.

Figure 6:
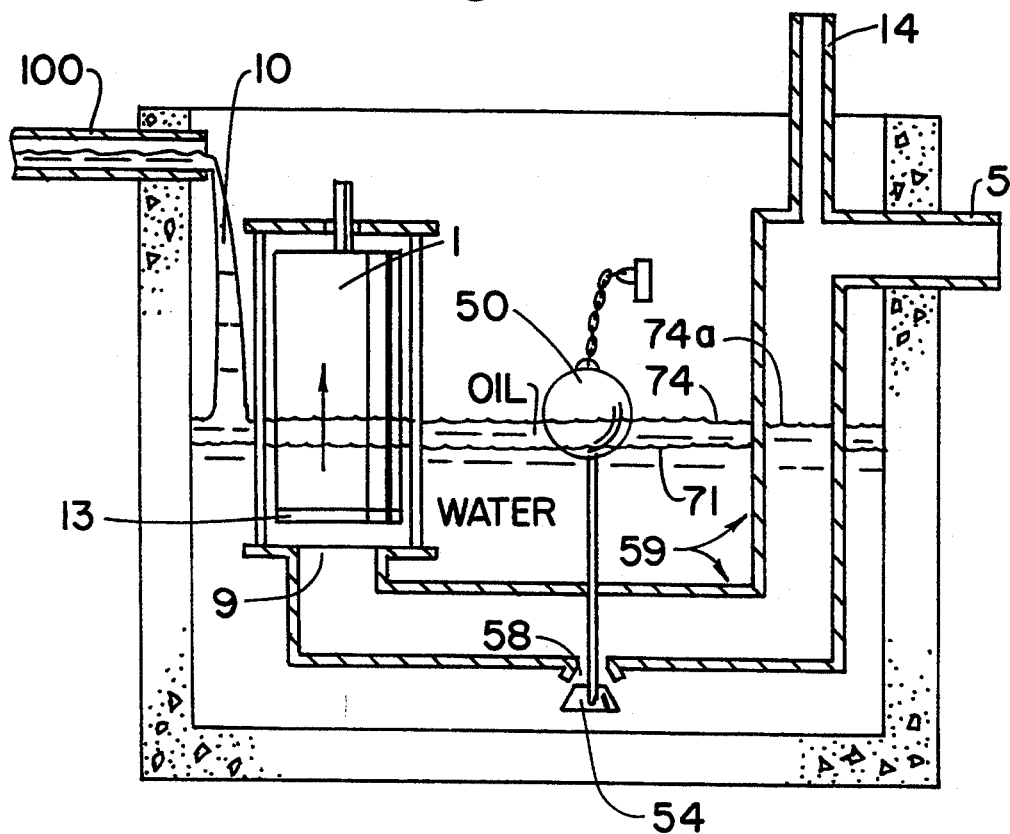

Referring to FIG. 6:

As the surface 74 of the liquid inside the containment 2 continues to rise, the liquid imparts a buoyant force to the primary float 1. As will be appreciated by those skilled in the art, as long as the elevation of the surface 74a of the liquid inside of the outlet conduit 59 is at substantially the same elevation as the surface 74 of the liquid outside of the outlet conduit, the hydrostatic pressure inside and outside the primary orifice 9 at the elevation of the bottom of the valve disk 13 is in equilibrium. Accordingly, after a sufficient quantity of water has been re-introduced into the containment 2 to float the primary float 1, the primary float 1 will begin to float and the valve disk 13 will become unseated from the primary orifice 9.

Depending upon the elevation of the secondary float 50, the primary float 1 may begin to float (i.e. unseat) before the secondary float 50 begins to float if the liquid inside of the containment 2 is substantially oil-free. If the liquid inside of the containment 2 contains a substantial quantity of oil, the relatively lower density of the oil/water mixture will prevent the primary float 1 from floating (i.e. unseating), and, as the elevation of the liquid inside the containment reaches the secondary float 50, the secondary float (being less dense than oil) will begin to float, thereby closing the secondary orifice 58 and preventing discharge of the liquid through the outlet conduit 59.

It is preferable that the secondary float 50 be positioned such that the secondary float is at an elevation (when the secondary seal 54 is closed against the secondary orifice 58) that is equal to or above the maximum elevation of the surface 74 of the liquid at which the primary float 1 sinks and rests upon the primary orifice 9. In other words, it is preferable that, as the surface 74 of the liquid inside the containment continues to rise, the primary float 1 re-floats before the secondary float 50 re-floats, (provided the liquid is substantially oil-free).

As discussed previously, (see Background), for direct-acting, outlet closing (primary) floats of a practical size, the maximum allowable head against which such direct-acting floats are capable of re-opening is very small, (in the 1-inch to 2-inch range). Accordingly, it is necessary that the minimum elevation of the surface of the liquid in the containment that can cause the secondary float 50 to float (and thereby effect the closure of the secondary seal 54 against the secondary orifice 58), be no more than two inches below the minimum elevation of the surface of the liquid which is capable of floating the primary float 1. In general terms, the minimum elevation of the "effective waterline" of the secondary float 50 at which the secondary float may float cannot be more than "Y"-inches below the elevation of the "effective waterline" of the primary float 1 at which the primary float may float, where the value of "Y" is calculated by the equation:

$$Y = D \times L \times X,$$

where Y corresponds to the difference in total head pressure above the primary orifice 9 (in inches of water) and the water head below the valve disk 13 (in inches of water) as may be determined by measurement of the difference in the elevation of the surface 74a of the liquid inside the outlet conduit and the elevation of the surface 74 of the liquid inside the containment 2; and D is the difference between the specific gravity of water and the specific gravity of the primary float 1; and L is the vertical length of the primary float 1 (assuming a constant cross-sectional area); and X is the ratio of cross-sectional areas of the primary float 1 to the area of the primary orifice 9 upon which the primary float is seated. As used herein, the term "effective waterline" means the horizontal line on a float which corresponds to the position of the surface of a liquid when said float is permitted to freely float in said liquid, regardless of whether or not said liquid is actually water, oil, a mixture of oil and water, or other liquids(s).

In the preferred embodiment of the invention the primary float 1 has a specific gravity between that of water and that of oil; and the secondary float 50 has a specific gravity less than that of both oil and water, and is preferably less than 0.50. In addition, the volume of the secondary float 50 preferably is only a fraction of the volume of the primary float 1. Therefore, the secondary float 50 may float "higher" (that is, the secondary float may have a more shallow draft) in a given liquid than the primary float 1. But, as discussed previously above, it is preferable both (1) that the secondary float 50 be capable of floating (so as to effect the closure of the secondary orifice 58) whenever the surface of the liquid in the containment is above the discharge outlet 5; and (2) that, as the surface of the (re-introduced) liquid inside the containment rises, the primary float 1 begins to float (in water) before the secondary float 50 begins to float (in water). Accordingly, it is preferable that the minimum elevation of the "effective waterline" of the floating primary float 1 be beneath the elevation of the discharge outlet pipe 5.

Hence, in the preferred embodiment of the invention: (1) the discharge outlet 5 is lower than the outlet 100; (2) the primary orifice 9 is below the discharge outlet 5; (3) the primary float 1 is above the primary orifice 9; (4) the secondary float 50 is above the primary orifice 9; (5) the secondary float is capable of floating when the surface of the liquid in the containment is beneath the elevation of the discharge outlet 5 (i.e. the minimum elevation of the effective waterline of the secondary float is below the discharge outlet); (6) the primary float 1 is capable of floating when the surface of the liquid in the containment is beneath the elevation of the discharge outlet 5 (i.e. the minimum elevation of the effective waterline of the primary float is below the discharge outlet); and, (7) the secondary float is not capable of floating when the elevation of the surface of the liquid in the containment 2 is below the minimum depth of water that is necessary to float the primary float 1 (i.e. the elevation of the effective waterline of the secondary float is above the minimum elevation of the effective waterline of the primary float).

Figure 7:
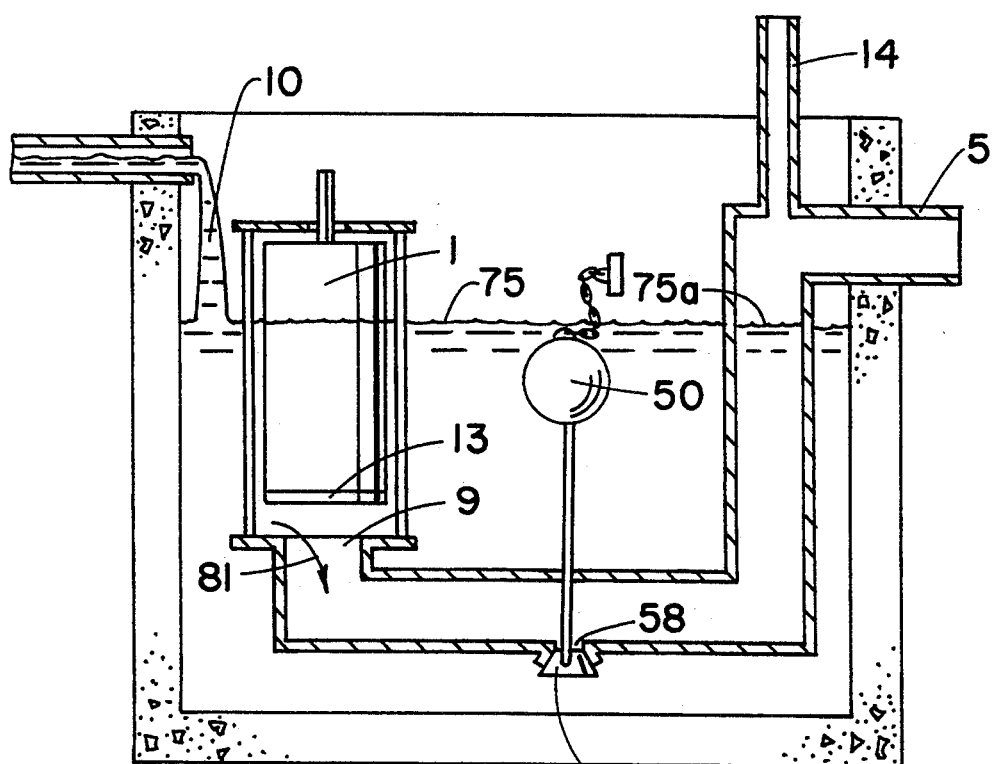

Referring to FIG. 7:

As waste water 10 continues to enter the containment 2, the secondary float 50 becomes immersed in the liquid, which causes the secondary seal 54 to close against the secondary orifice 58. The elevation of the surface 75a of the liquid inside of the containment and the elevation of the surface 75 of the liquid inside of the outlet conduit 59 continue to rise at substantially the same rate, as some of the water flows into the outlet conduit 59 through the open primary orifice 9, (as indicated by arrow 81).

Figure 8:
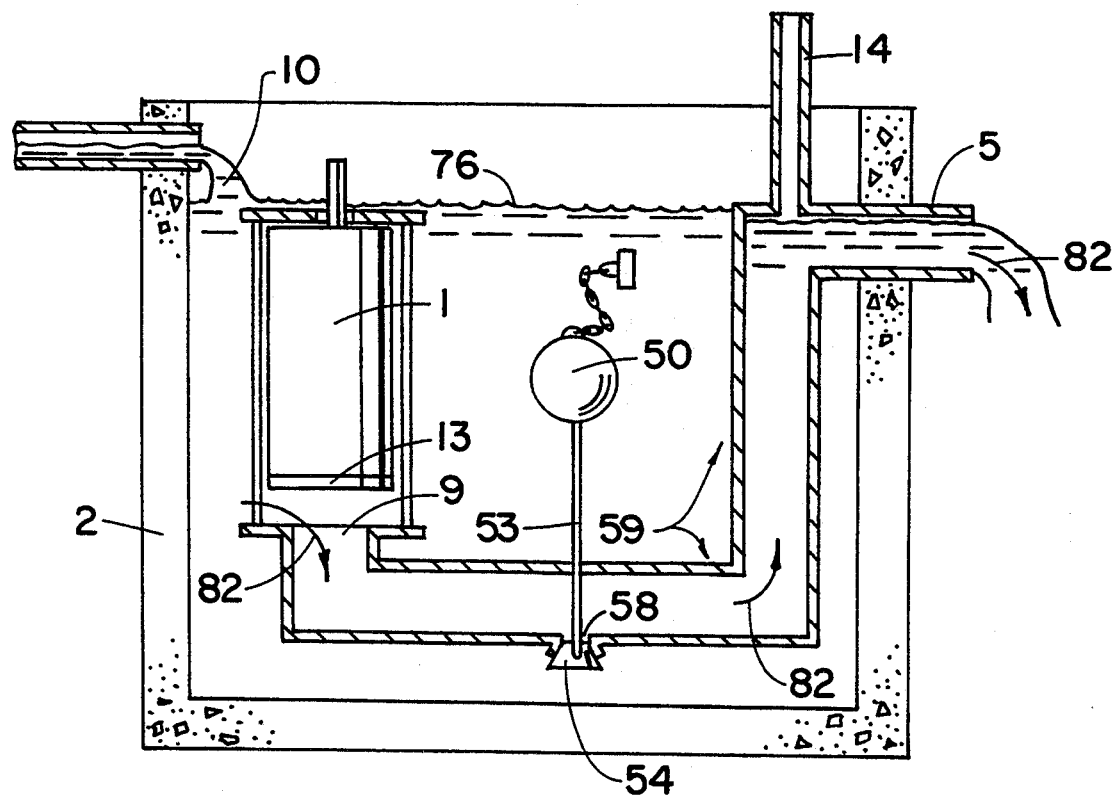

Referring to FIG. 8:

When the elevation of the surface 76 of the liquid inside of the containment 2 becomes at least as high as the discharge outlet 5, water will be gravity discharged from the device by passing through the primary orifice 9 and the outlet conduit 59, as indicated by arrows 82, provided that the liquid does not contain a substantial quantity of oil (which would effect the closure of the primary float 1, as described above).

In the preferred embodiment of the invention the primary float 1 has a specific gravity of between 0.93 and 0.95, so as to allow it to float in water, but sink in oil. Preferably the secondary float 50 has a specific gravity substantially less than both oil and water (i.e. <0.50), so as to allow the secondary seal 54 to maintain a positive seal against the secondary orifice 58 whenever there is a sufficient quantity of liquid (of any description) inside of the containment.

In the preferred embodiment of the invention, the primary float 1 comprises a water-tight, ballasted, elongated hollow body to which may be attached to a valve disc 13 which is adapted to seat against the primary orifice.

Valve disc 13, on the lower end of float 1, is in a plane perpendicular to the vertical axis of the float and is so constructed as to form a watertight seal when float 1 sinks and valve disc 13 covers orifice 9. The valve disc may be made of soft, pliable, closed cell gasket material or of other materials and configurations as is common practice in the manufacture of valves. Both the valve disk 13 and the perimeter of the primary orifice 9 may be bevelled so that the valve disk 13 may nest inside of the primary orifice 9.

In the preferred embodiment of the invention, the primary float 1 comprises an elongated body. This construction is considered preferable because it minimizes the requirements for close tolerances in the construction of the device, and allows for floating/sinking of the primary float 1 while the oil/water interface of the liquid in the containment 2 is a considerable (i.e. safe) distance from the primary orifice. However, it is within the scope of the present invention to employ a spherical or other shape float in place of the primary float.

In the preferred embodiment of the invention the secondary orifice 58 is located on the underside of the horizontal conduit 3. In this location, the secondary seal 54 can be closed by direct attachment (i.e. link arm device 53) to the secondary float 50, and upward movement of the secondary float 50 results in a corresponding upward movement of the secondary seal 54. In addition, because the secondary orifice 54 is aimed downward, it is less susceptible to debris which may otherwise fall into or foul the orifice and impede the operation of the secondary seal 54. In addition, by locating the secondary orifice 54 at or near the lowest point of the outlet conduit, it reduces the chances that the level of the oil/water interface will reach the secondary orifice in event of leakage at either the primary or secondary orifices.

Figure 11:
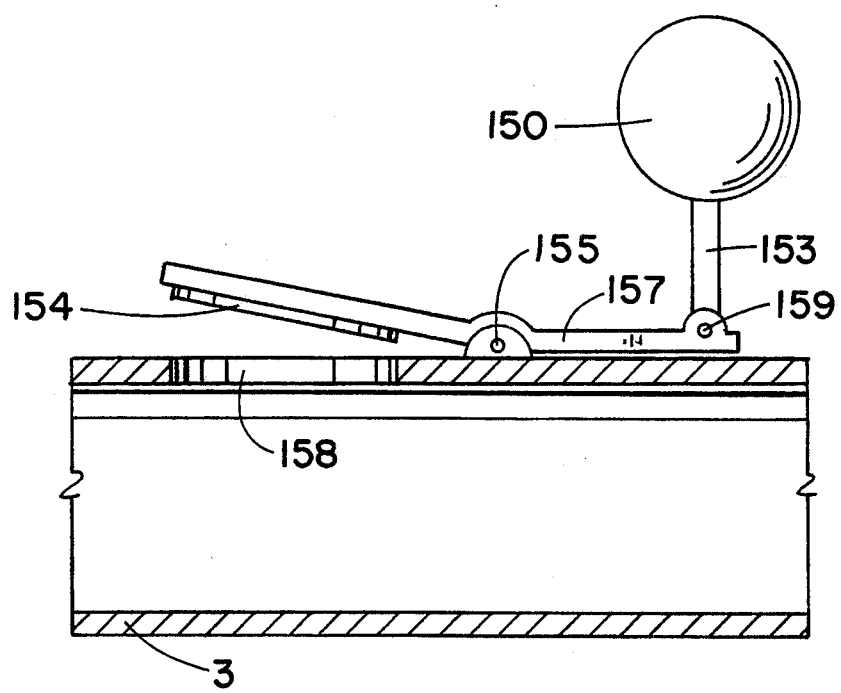
FIG. 11 is a cross-sectional view of the horizontal conduit showing the details of construction of a modification of the secondary seal; and, FIG. 12 is a cross-sectional view of the riser conduit showing the details of construction of a modification of the secondary seal.

However, it is within the scope of the present invention for the secondary orifice to be located anywhere along the outlet conduit 59, provided the secondary orifice 58 is not higher than the minimum elevation of the effective waterline of the secondary float 50. FIG. 11 illustrates a modified secondary orifice 158, wherein the modified secondary orifice 158 is located in the top of the horizontal conduit 3. The modified secondary float 150 is connected to the modified secondary seal 154 by a modified link arm 153 attached to a lever arm 157 which is pivotally connected 159 to the horizontal conduit 3. In this modification of the invention, vertical movement of the modified secondary float effects substantially vertical movement of the modified secondary seal 154, such that upward movement of the modified secondary float 150 causes the modified secondary seal 154 to close the modified secondary orifice 158.

Figure 12:
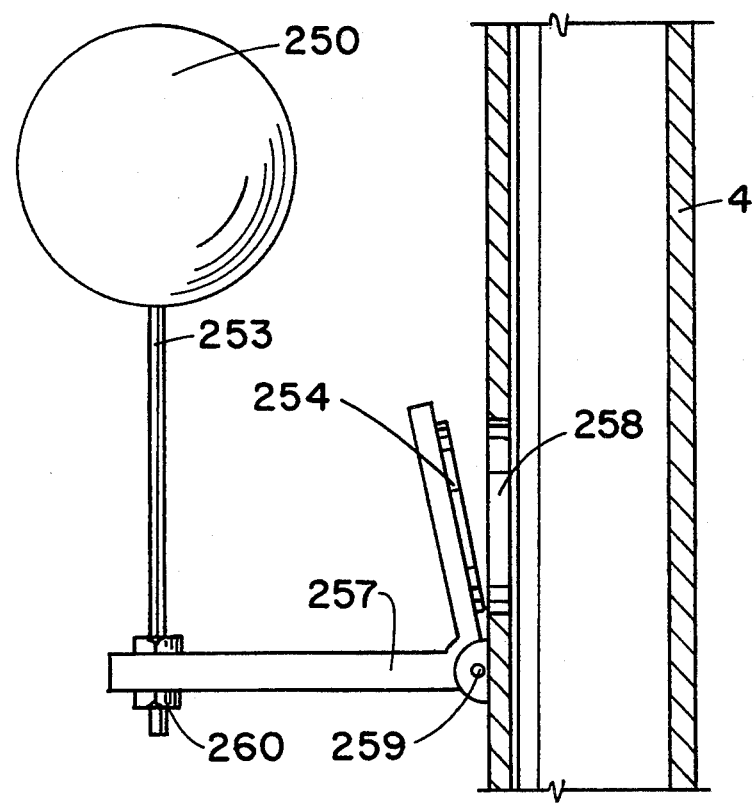

FIG. 12 illustrates another modification of the secondary orifice 258, wherein the modified secondary orifice 258 is located in the riser 4. The modified secondary float 250 is connected to the modified secondary seal 254 by a modified link arm 253 attached to a lever arm 257 which is pivotally connected 259 to the riser 4. In this modification of the invention, vertical movement of the modified secondary float effects substantially horizontal movement of the modified secondary seal 254, such that upward movement of the modified secondary float 250 causes the modified secondary seal 254 to close the modified secondary orifice 258.

It will be appreciated by those skilled in the art that an apparatus constructed in accordance with the above specification, less the containment 2 and the inlet 100, can be used as an oil-water separator valve, and that such an oil-water separator valve may be inserted as a single unit into, or adapted to be used in conjunction with, many types of holding tanks, catch basins, and the like, to prevent the egress of oil from said holding tanks, catch basins, and the like. Accordingly, it will be understood that, while the present invention is adapted to be used in conjunction with a containment vessel having an inlet, the scope of the invention is not limited to apparatus which intrinsically comprise such containment vessels.

While the above description contains specificities, these should not be construed as limitations on the scope of the invention, but rather as an exemplification of the preferred embodiment and certain modifications thereof. Many variations are possible, for example:

The secondary float 50 may be either directly attached to the secondary seal 54 by the link arm device 53 as described, or may simply be in communication with the secondary seal 54 via a combination of mechanisms;

Housing 11 can be a perforated pipe or other structure inside of which the primary float 1 is disposed;

The secondary float 50 may be enclosed inside of a perforated housing in order to minimize the opportunity for debris inside the containment 2 to accidently impede its movement;

The containment 2 may be provided with a drain line 91 and a manually closeable shut-off valve 92 (as illustrated in FIG. 4), by which means the containment may be intentionally drained, such as for cleaning;

The device may be adapted for use with liquids other than oil and water, so long as the primary float has a density lighter than that of the heavier liquid, and heavier than that of the lighter liquid;

The secondary float may have a density greater than that of the lighter liquid, but must in any event have a density less than that of the heavier liquid;

The containment 2 may either be a closed or open vessel, and when the containment 2 is a closed vessel the pressures inside of the vessel may be greater than those derived from gravity flow;

The containment 2 may be provided with an oil/water outlet at an elevation above the discharge outlet 5 and below the inlet 100; and, In place of a valve disc 13, the underside of float may be compatibly formed such that when the primary float 1 rests on top of the orifice 9 the bottom of the float 1 adequately closes the orifice;

Accordingly, the scope of the invention should be determined not by the embodiment illustrated, but by the appended claims and their legal equivalents.

I claim:

1. A flow control device adapted to separate a mixture of two liquids of different densities, and for controlling the discharge therefrom of said two liquids, comprising:

a vessel;

inlet means through which said fluid mixture enters said vessel;

a conduit operationally disposed within said vessel provided with an upwardly opening first orifice adapted to be closed by first valve means;

said conduit further being in fluid communication with a first discharge outlet;

an operationally vertically movable first float positioned within said vessel, said first float being vertically movable within a finite first range of travel;

first orifice closing means situated beneath the lowermost extremity of said first float adapted to close said upwardly opening first orifice when said first float is at the lowermost extremity of said first range of travel to prevent the flow of fluid into said conduit through said first orifice;

said conduit having a first portion disposed intermediately between said first orifice and said first discharge outlet, said first portion of said conduit being substantially at a first elevation wherein said first elevation is higher than said upwardly opening first orifice;

an operationally vertically movable second float positioned within said vessel, said second float being vertically movable within a finite second range of travel;

a second orifice disposed in said conduit between said first orifice and said first discharge outlet adapted to be closed by second valve means; and, second orifice closing means in communication with said second float adapted to close said second orifice when said second float is at the uppermost extremity of said second range of travel to prevent the flow of fluid into said conduit through said second orifice.

2. The device according to claim 1 wherein:

the specific gravity of said first float is less than the specific gravity of the heavier of said two liquids and greater than the specific gravity of the lighter of said two liquids; and the specific gravity of said second float is less than the specific gravity of the lighter of said two liquids.

3. The device according to claim 2, wherein:

the minimum elevation of neutral buoyancy of said first float in said heavier of said two liquids is at a second elevation, wherein said second elevation is lower than said first elevation.

4. The device according to claim 3, wherein:

the minimum elevation of neutral buoyancy of said first float in said heavier of said two liquids is at a third elevation, wherein said third elevation is higher than said second elevation.

5. The device according to claim 4, wherein:

the minimum elevation of neutral buoyancy of said first float in said lighter of said two liquids is at a fourth elevation, wherein said fourth elevation is lower than said first elevation.

6. The device according to claim 5, wherein the area of opening of said first orifice is at least four times the area of opening of said second orifice.

7. The device according to claim 6, wherein said conduit is vented to atmosphere.

8. A flow control device adapted to separate a mixture of two liquids of different densities, and for controlling the discharge therefrom of said two liquids, comprising:

a conduit provided with an upwardly opening first orifice adapted to be closed by first valve means;

said conduit further being in fluid communication with a first discharge outlet;

an operationally vertically movable first float positioned above said first orifice, said first float being vertically movable within a finite first range of travel;

first orifice closing means situated beneath the lowermost extremity of said first float adapted to close said upwardly opening first orifice when said first float is at the lowermost extremity of said first range of travel to prevent the flow of fluid into said conduit through said first orifice;

said conduit having a first portion disposed intermediately between said first orifice and said first discharge outlet, said first portion of said conduit being substantially at a first elevation wherein said first elevation is higher than said upwardly opening first orifice;

a second orifice disposed in said conduit between said first orifice and said first discharge outlet adapted to be closed by second valve means;

an operationally vertically movable second float, said second float being vertically movable within a finite second range of travel; and, second orifice closing means in communication with said second float adapted to close said second orifice when said second float is at the uppermost extremity of said second range of travel to prevent the flow of fluid into said conduit through said second orifice.

* * * * *